United States Patent [19]

Seiden

[11] 3,832,727

[45] Aug. 27, 1974

[54] PHOTOGRAPHIC CAMERA HAVING AN INTERNALLY MOUNTED OBJECTIVE LENS

[75] Inventor: Myron A. Seiden, Needham, Mass.

[73] Assignee: Polaroid Corporation, Cambridge, Mass.

[22] Filed: Aug. 16, 1973

[21] Appl. No.: 389,008

[52] U.S. Cl. .................................. 354/196, 355/55
[51] Int. Cl. .............................................. G03b 3/00
[58] Field of Search ........................... 355/55; 95/45

[56] References Cited
UNITED STATES PATENTS

| | | | |
|---|---|---|---|
| 547,855 | 10/1895 | Lee | 95/45 |
| 1,535,225 | 4/1925 | Hays | 95/45 |
| 1,895,654 | 1/1933 | Forrest | 355/55 |
| 2,307,479 | 1/1943 | Annick | 95/45 X |
| 2,458,269 | 1/1949 | Huebner | 355/55 |
| 2,741,170 | 4/1956 | Wenke | 95/45 |
| 2,818,768 | 1/1958 | Updegraff | 95/45 |

*Primary Examiner*—John M. Horan
*Attorney, Agent, or Firm*—William A. Danchuk

[57] ABSTRACT

A photographic camera characterized in having its objective lens mounted behind the camera shutter and within the collapsible bellows interfaced between the shutter and the camera's film plane. The camera aperture, located within the lens housing, is fully adjustable due to an actuating mechanism placed between the lens housing and an adjustment indicator located outside the bellows. Configured as such, the camera provides an optimized design for extreme image reduction of a full baseboard view upon a relatively small film format.

10 Claims, 2 Drawing Figures

PHOTOGRAPHIC CAMERA HAVING AN INTERNALLY MOUNTED OBJECTIVE LENS

BACKGROUND OF THE INVENTION

Photographic cameras have been developed which are characterized in having a film plane which is movable with respect to the objective lens of the camera. These cameras are commonly referred to as variable focusing cameras, press or bellows cameras. In general, this variety of camera incorporates a relatively large (4 inch by 5 inch) film format and commonly is movably mounted upon a vertical column. These varieties of cameras provide more than adequate results when employed for magnification purposes on their relatively large film formats. However, they are not easily employed in reducing an image to a relatively small film format, i.e., 35mm, placed at the film plane of the camera. One reason for this is that the camera is physically limited in its movement such that the camera's objective lens cannot be positioned close enough to the film plane to obtain a reduced image on the small film format. One solution is to mount a long focal length lens to the camera and displace the camera a sufficient distance from the subject so as to place the subject within a 35mm format on the film. This solution, however, is not practical within the physical limits imposed by the size of the column upon which the camera is mounted. In particular, the camera would have to be placed approximately 20 feet from the subject, obviously without the size limits of the column.

SUMMARY OF THE INVENTION

The present invention is directed to a photographic camera characterized in having its objective lens mounted behind the camera shutter and within the collapsible bellows interfaced between the shutter and the film plane. As configured, the camera is ideally suited for accommodating extreme reductions of subject to be photographed upon small films formats. Moreover, the camera according to the present invention retains the adjustability of the camera's shutter which is conveniently placed outside of the camera's bellows. The camera according to the present invention additionally provides an optimized lens construction for extreme image reduction and provides a full baseboard view for the small film format within the limits imposed by the column height.

It is therefore a general object and feature of the present invention to provide a photographic camera including an objective lens mounted within the bellows system of the camera for permitting extreme reductions of a subject to be photographed upon a relatively small film format.

It is another object and feature of the present invention to provide a photographic camera including an objective lens mounted within the bellows of the photographic camera while retaining the shutter of the camera in a convenient operable position outside of the bellows.

Still another object and feature of the present invention is to provide a photographic camera characterized in having an objective lens mounted within the bellows of the camera, the objective having an optimized construction for reducing the image of a subject to be photographed upon a relatively small film format of the film plane of the camera.

Other objects of the invention will, in part, be obvious and will, in part, become apparent as the following description proceeds. The features of novelty which characterize the invention will be pointed out with particularity in the claims annexed to and forming part of the specification.

BRIEF DESCRIPTION OF THE DRAWINGS

For a fuller understanding of the nature and objects of the invention, reference should be made to the following detailed description taken in conjunction with the accompanying drawings wherein.

DETAILED DESCRIPTION OF THE INVENTION

Figure 1:
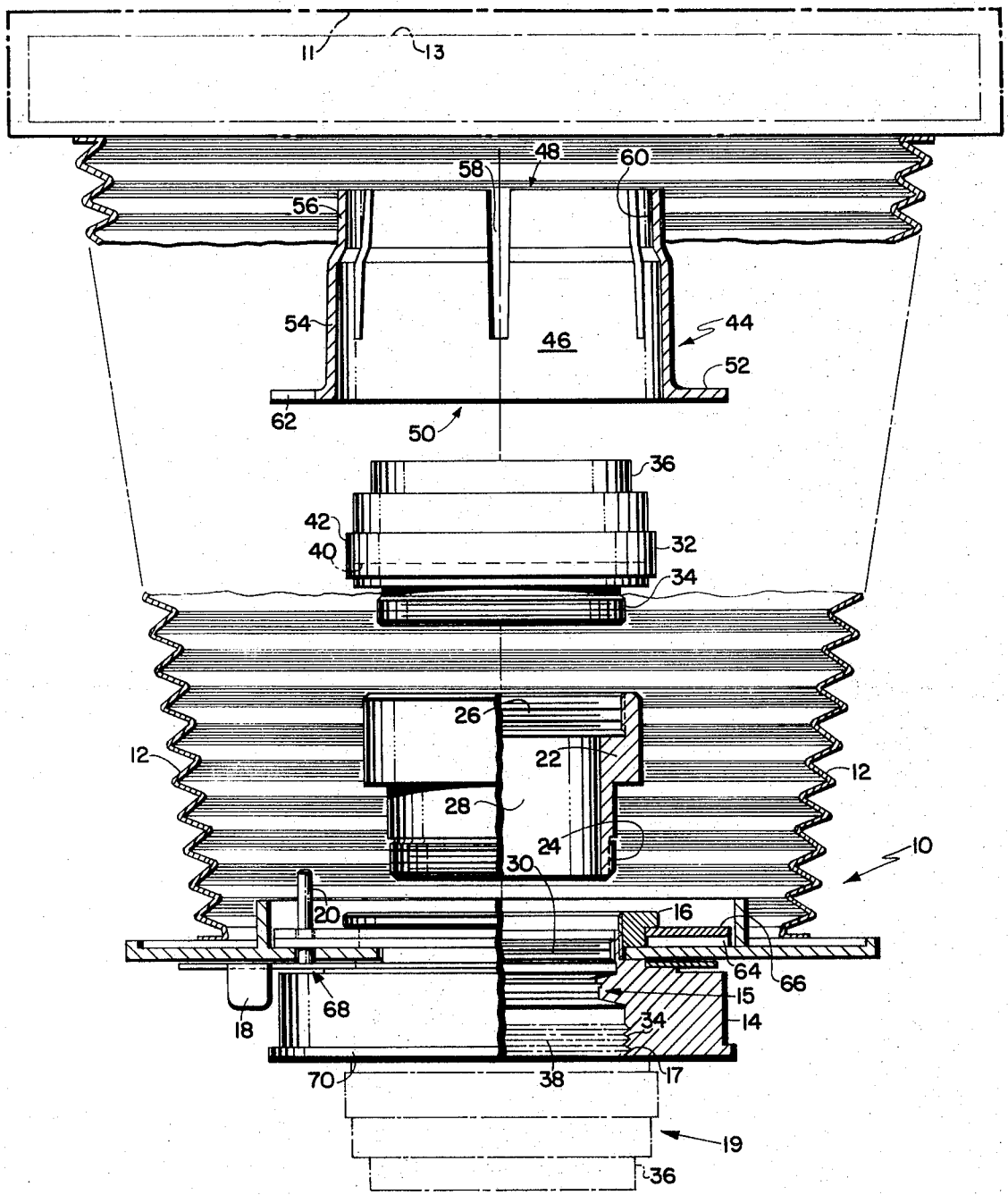
FIG. 1 is an exploded side view of a portion of a photographic camera having portions illustrated in sections in order to provide more internal detail.

Referring to FIG. 1, there are shown the specific portions of a photographic camera concerned with the present invention. A shutter board, shown generally at 10, is located at the front of the camera and is attached to one end of a set of light-tight collapsible bellows 12. Collapsible bellows 12 provide a light-tight enclosure between shutter board 10 and a film housing shown generally at 11 located at the opposite end of bellows 12 at the rear of the camera. Film housing 11 is configured to releasably retain photographic materials contained within a film holder shown generally at 13. Shutter board 10 includes all the necessary shutter components for the initiation of a photographic exposure. Specifically, board 10 includes a shutter housing 14 containing a conventional type shutter 15 and a mounting ring 16 for connecting the shutter housing 14 to the shutter board 10. Shutter board 10 further includes an aperture indicator member 18 and an aperture indicator drive pin 20, both of which will be discussed in further detail as the specification progresses.

Mounted behind shutter board 10 is an adapter or spacer member 22 having a male threaded portion 24 located at its forward end and a female threaded portion 26 located at its other end. Spacer member 22 is also formed with a hollow interior 28 extending through the entire length of spacer member 22. Male portion 24 of member 22 is adapted to be threadably mounted to shutter board 10 through a female threaded portion 30 formed in front of mounting ring 30.

Positioned behind spacer member 22 is a lens housing 32. Incorporated within lens housing 32 is a tessar lens arrangement (not shown) having a cemented doublet and an airspaced doublet. In the preferred embodiment of the present invention, the lens housing 32 includes lenses having a combined effective focal length of approximately 75mm. Lens housing 32 is formed having a male threaded portion 34 and a non-threaded portion 36 located at its opposite end. Under "normal" operating circumstances, lens housing 32 is coupled to the front of shutter housing 14 through a female thread located at 17 provide in a recess 38 in the front portion of housing 14. As a result, the non-threaded portion 36 is directly forwardly, instead of rearwardly, as shown in FIG. 1.

The tessar lens arrangement incorporated within lens housing 32 includes a cemented doublet and an airspaced doublet. Under "normal" photographic circumstances when the lens housing is mounted to the front of housing 14, as shown by dashed lines 19, the air-spaced doublet is located behind the cemented doublet — a configuration which is highly desirable for high magnification situations commonly utilized in a large film format camera. For this reason the air-spaced doublet is located proximate threaded end 34 while the cemented doublet is located near the non-threaded end 36. When lens housing 32 is connected to the front of shutter housing 14, the specific positioning of the two lens doublets (the cemented doublet in front of the air-spaced doublet) satisfies the requirements necessitated for large magnification situations. Alternately, when lens housing 32 is reverse mounted front-to-rear, the new positioning of the two lens doublets (with the air-spaced doublet in front of the cemented doublet) permits satisfactory results for situations in which high reduction ratios are necessary; the ratios denoting the size differential between the object size and the image size at the film plane. It should also be noted that there exists an inverse relationship between the magnification and reduction ratios for a given lens. What is a high magnification ratio for a given lens in a given direction is equal to a low reduction ratio for the same given lens in the opposite direction. Similarly, a high reduction ratio is equal to a low magnification ratio for the same lens in opposing directions of use.

The mere placement of lens housing 32 in the reverse orientation, previously explained, (with the air-spaced doublet in front of the cemented doublet) does not solve the problem encountered with high reduction situations. Specifically, the reverse orientation of lens housing 32 in recess 38 would not allow the placement of the lens elements close enough to the film plane to permit high reduction of an object. The high reduction ratios utilized in the preferred embodiment reduce a relatively large 2' × 3' base board area to a 35mm film format. In order to achieve this extreme level of reduction, the lens housing 32 is preferably moved within the bellows 12.

Provided within lens housing 32 is a variable aperture, denoted by dashed line 40. Aperture 40 is varied by the rotation of an exterior portion of lens housing 32 while the remainder of housing 32 is fixedly retained through the male threaded portion 34. Specifically, manual rotation of a stepped segment 42 of housing 32 relative to the rest of housing 32 opens and closes the aperture to permit varying amounts of light to enter.

An aperture coupler 44, positioned behind lens housing 32, couples stepped portion 42 with aperture indicator 18. Aperture coupler 44 is fit over stepped portion 42 and is retained in that status through a frictional fit between the two. This fit may be best seen by referring to FIG. 2. Coupler 44 is of a generally cylindrical shape and includes a hollow central portion 46, a first open end 48, a second open end 50 and a flanged portion 52 positioned at the forward end of coupler 44. The cylindrical portion of coupler 44 is stepped, having a lower portion 54 and a smaller upper portion 56. The wall thickness of portions 54 and 56 is substantially the same, resulting in a larger inner diameter for portion 54 than that of portion 56. Located about the upper periphery of coupler 44 are a plurality of slots 58. Slots 58 extend from end 48 toward end 50 and permit a slight expansion of upper portion 56 for insuring a good frictional fit between stepped portion 42 of lens housing 32 and an inner wall 60 of upper portion 56. Located on an outer portion of flange 52 is a slot 62 radially oriented with respect to coupler 44. Slot 62 is operative to capture aperture indicator drive pin 20 when coupler 44 is seated on the rearward side of shutter board 10. A light-tight seal between shutter board 10 and coupler 44 is provided a light seal element 64 and a light seal retainer 66 next adjacent thereto. Light seal element 64 and retainer 66 are both seated beneath mounting ring 16. As a result, a light-tight seal is provided between shutter board 10 and the interior of the camera.

Figure 2:
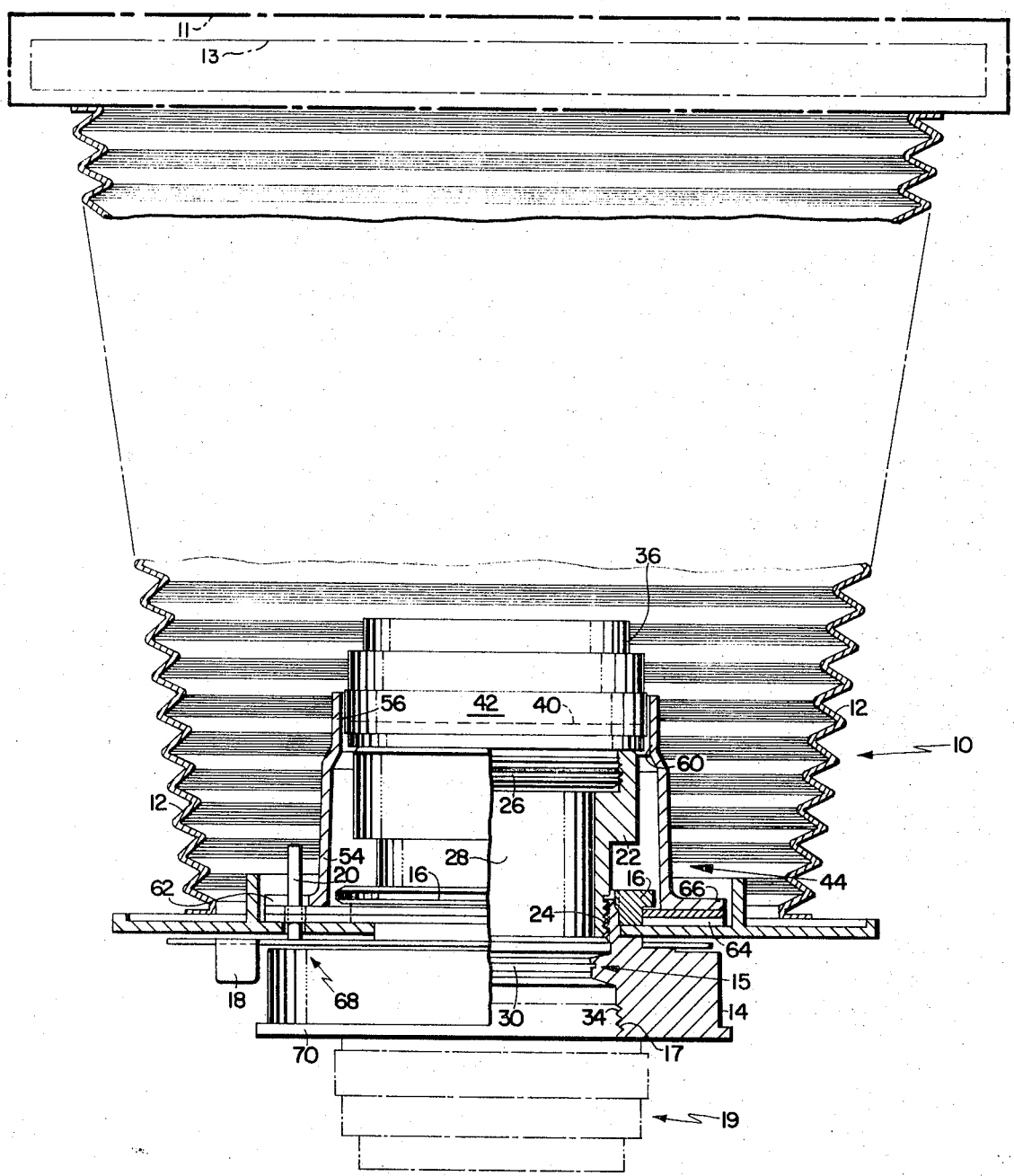
FIG. 2 is a photographic camera of FIG. 1 in an assembled status ready for an exposure.

When properly positioned, as best seen in FIG. 2, coupler 44 serves to connect or couple lens housing 32 with aperture indicator 18. Movement of indicator 18 is translated to aperture indicator drive pin 20 through the connection between the two shown at 68. The movements of both indicator 18 and pin 20 are circular about the center of shutter board 10. Due to the capture of pin 20 within slot 62, the circular movement of pin 20 causes a rotation of coupler 44 about the optical axis of lens housing 32. This rotation of coupler 44 is translated to stepped portion 42 of lens housing 32. Stepped portion 42 is rotated to cause a change in the variable aperture (denoted by dashed line 40) contained within lens housing 32. This rotation is permitted due to the retention of lens housing 32 in a non-movable state by its connection with adapter 22 and shutter board 10. The amount of closing or opening of aperture 40 is, in the end, determined by the amount of rotation of indicator 18 to cause an equal amount of rotation of stepped portion 42 of lens housing 32.

It should become apparent that the lens housing 932 may not only be easily adapted to fit within the bellows 12 of the camera but additionally, the variability of the aperture contained therein is retained. The aperture may now be eaily varied from without the bellows while the lens housing which contains it is retained within for high reduction purposes. Should the camera operator desire to change to a high magnification setup, he need only remove adaptor 22 and coupler 44 from the interior of bellows 12 and reconnect the reversed lens housing 32 to the front of shutter housing 14 through recess 38 and threads (not shown) indented therein. Under such circumstances, variance of the aperture 40 is directly accomplished by manually rotating stepped portion 42 through a conventional aperture ring shown as at 70.

While certain changes may be made in the above apparatus without departing from the scope of the invention herein involved, it is intended that all matter contained in the above description as shown in the accompanying drawings shall be interpreted as illustrative and not in a limiting sense.

What is claimed is:

1. A photographic camera for exposing photosensitive material having a given film format at a given film plane, said camera having one configuration for permitting large magnification ratios for a subject to be photographed upon said film format and a second configuration for permitting extreme reduction ratios for a subject to be photographed upon said film format, said camera comprising:

a housing for releasably retaining a quantity of photosensitive material at said film plane;
   a support member;

means for providing a light-tight enclosure surrounding the light path between said support member and said film plane in said housing;

a lens assembly including an objective lens and a variable aperture, said lens assembly being positioned between said support member and said film plane within said means for providing a light-tight enclosure when said camera is in its said second configuration for providing extreme reductions of the image of said subject to be photographed and said lens assembly being positioned in front of said support member exteriorly of said means for providing a light-tight enclosure when said camera is in its said first configuration for providing large magnification ratios of the image of said subject to be photographed upon said film format; and means for varying said aperture contained within said lens assembly from the exterior of said light-tight enclosure proximate said support member when said camera is in said first configuration and when said cmaera is in said second configuration.

2. The photograhic camera of claim 1 in which said support member includes a shutter housing, said shutter housing including a shutter.

3. The photographic camera of claim 1 in which said film plane is configured to be selectively movable with respect to said objective lens of said camera.

4. The photographic camera of claim 1 in which said means for providing a light-tight enclosure is a variable bellows member, said variable bellows member providing a light-tight enclosure between said support member and said film plane for a plurality of distances between said lens assembly and said film plane when said camera is in its said second configuration, said variable bellows member being connected to said support member.

5. The photographic camera of claim 1 in which said means for varying said aperture includes a first actuating means for varying said aperture when said lens housing is positioned in front of said support member exteriorly of said means for providing a light-tight enclosure and a second actuating means configured to receive a portion of said first actuating means for varying said aperture when said lens assembly is positioned between said support member and said film plane nd within said means for providing a light-tight enclosure, said second actuating means causing said aperture to be varied exteriorly from said means for providing a light-tight enclosure.

6. The photographic camera of claim 5 in which said first actuating means includes means formed as a select portion of said lens assembly movable with respect to the remainder of said lens assembly for varying said aperture.

7. The photographic camera of claim 5 in which said first actuating means includes means formed as a select portion of said lens assembly movable with respect to the remainder of said lens assembly for varying said aperture, said second actuating means being configured to receive said select portion of said first actuating means for movement with respect to the remainder of said lens assembly, said select portion of said lens assembly being movable by said second actuating means for varying said aperture contained within said lens assembly when said camera is in said second configuration.

8. The photographic camera of claim 6 in which said camera further includes coupling means for statically coupling said remainder of said lens assembly to the interior of said support member when said camera is in its second configuration.

9. The photographic camera of claim 8 in which said second actuating means includes an actuating member provided exteriorly of said light-tight enclosure means and linking means for linking said first actuating means to said actuating member, said actuating member being movable for causing said first actuating means to vary said aperture when said camera is in its said second configuration.

10. The photographic camera of claim 9 in which said linking means includes a first member configured to frictionally receive said select portion of said lens assembly, and a second member for connecting said first member to said actuating member, said actuating member being movable for causing said second member to move said first member to move said select portion of said lens assembly to cause said aperture to vary when said camera is in said second configuration.

* * * * *